(12) United States Patent
Endo et al.

(10) Patent No.: US 7,799,123 B2
(45) Date of Patent: Sep. 21, 2010

(54) INKJET INK

(75) Inventors: Toshihiro Endo, Tokyo (JP); Masakatsu Arai, Tokyo (JP); Ruri Watanabe, Tokyo (JP)

(73) Assignee: Riso Kagaku Corporation, Tokyo (JP)

( * ) Notice: Subject to any disclaimer, the term of this patent is extended or adjusted under 35 U.S.C. 154(b) by 665 days.

(21) Appl. No.: 11/592,145

(22) Filed: Nov. 3, 2006

(65) Prior Publication Data

US 2007/0101901 A1    May 10, 2007

(30) Foreign Application Priority Data

Nov. 4, 2005    (JP) ............................. 2005-320648

(51) Int. Cl.
    *C09D 11/02* (2006.01)
(52) U.S. Cl. .................................. 106/31.86
(58) Field of Classification Search ............... 106/31.86
    See application file for complete search history.

(56) References Cited

U.S. PATENT DOCUMENTS

| 4,954,174 | A |   | 9/1990 | Imagawa |   |
|---|---|---|---|---|---|
| 5,849,814 | A |   | 12/1998 | Fujita |   |
| 7,022,172 | B2 |   | 4/2006 | Ohkawa et al. |   |
| 7,393,400 | B2 | * | 7/2008 | Kitawaki et al. | ......... 106/31.86 |
| 2003/0177948 | A1 |   | 9/2003 | Ohkawa et al. |   |
| 2003/0192453 | A1 | * | 10/2003 | Ohkawa et al. | .......... 106/31.57 |
| 2004/0227799 | A1 | * | 11/2004 | Ogawa et al. | ................ 347/100 |
| 2005/0020728 | A1 |   | 1/2005 | Jackson et al. |   |
| 2007/0022904 | A1 | * | 2/2007 | Kitawaki et al. | ......... 106/31.86 |
| 2009/0198003 | A1 | * | 8/2009 | Endo | ........................... 524/315 |
| 2009/0281219 | A1 | * | 11/2009 | Watanabe et al. | ........... 524/317 |

FOREIGN PATENT DOCUMENTS

| EP | 0 304 887 A2 | 3/1989 |
| EP | 1 344 802 A1 | 9/2003 |
| EP | 1 354 920 A2 | 10/2003 |
| JP | 2003-261808 A | 9/2003 |
| WO | WO 2004/011558 A | 2/2004 |

* cited by examiner

*Primary Examiner*—Jerry Lorengo
*Assistant Examiner*—Veronica Faison Gee
(74) *Attorney, Agent, or Firm*—Fitch, Even, Tabin & Flannery

(57) ABSTRACT

An inkjet ink is provided, which produces a print that does not stick to a print printed by a plane paper copier or a laser printer even when these prints are laid on each other with the printed surfaces thereof facing each other. The inkjet ink comprises at least a pigment and a solvent, wherein 30 to 70% by weight of the solvent is constituted by a non-polar solvent, and 20% by weight or more of the solvent is constituted by an ester solvent having an α value of 6° to 8°, preferably 7° to 8°. Preferably, the ester solvent is at least one member selected from the group consisting of isooctyl palmitate, isooctyl isopalmitate and 2-octyldodecyl pivalate.

6 Claims, No Drawings

INKJET INK

This Application is a U.S. Utility Patent Application which claims foreign priority from Japanese Application No. 2005-320648, filed Nov. 4, 2005, the complete disclosure of which is incorporated herein by reference.

TECHNICAL FIELD

The present invention relates to an inkjet ink which is reduced in toner solubility and is excellent in on-machine stability.

BACKGROUND ART

Japanese Patent Laid-Open No. 2003-261808 discloses an oil-based inkjet ink improved in storage stability, which comprises a solvent 60% by weight or more of which is constituted by a polar organic solvent, in which 10% by weight or more of the polar organic solvent is constituted by an ester solvent.

However, when printed matters such as pamphlets are prepared by laying a print printed by the above inkjet ink on a print printed by a plane paper copier or a laser printer with the printed surfaces of the prints facing each other, there has been a problem that the printed surfaces are stuck to each other.

DISCLOSURE OF INVENTION

Accordingly, an object of the present invention is to provide an inkjet ink which produces a print which does not stick to a print printed by a plane paper copier or a laser printer even when these prints are laid on each other with the printed surfaces of the prints facing each other.

As a result of intensive researches made by the present inventors under the above object, they have found that ester solvents contained in the above-described oil-based inkjet ink dissolve components that form toner images printed by a plane paper copier or a laser printer on the printed surface, in particular a toner resin such as a styrene-acrylic resin. Then, the inventors have found that the above object can be achieved by an inkjet ink which comprises a solvent constituted by a polar solvent and a non-polar solvent in a specific range of proportion and comprises a specific ester solvent as the polar solvent in a specific amount or more, and have completed the present invention.

Accordingly, the present invention provides an inkjet ink comprising at least a pigment and a solvent, wherein 30 to 70% by weight of the solvent is constituted by a non-polar solvent, and 20% by weight or more of the solvent is constituted by an ester solvent having an a value of 6° to 8°.

According to preferred embodiments of the present invention, an ester solvent having an $\alpha$ value of 7° to 8° is used as the ester solvent. More preferably, at least one solvent selected from the group consisting of isooctyl palmitate, isooctyl isopalmitate and 2-octyldodecyl pivalate is used as the ester solvent.

According to the present invention, an inkjet ink comprising at least a pigment and a solvent is provided in which 30 to 70% by weight of the solvent is constituted by a non-polar solvent, in other words, 70 to 30% by weight of the solvent is constituted by a polar solvent, and therefore the ink is excellent in on-machine stability. In addition, 20% by weight or more of the solvent is constituted by a specific ester solvent, i.e., an ester solvent having an $\alpha$ value of 6° to 8°, and therefore the ink has reduced toner solubility. Accordingly, an inkjet ink which produces a print that does not stick to prints printed by a plane paper copier or a laser printer is provided.

PREFERRED EMBODIMENTS OF THE INVENTION

In the following, the present invention is described in more detail.

The inkjet ink of the present invention comprises at least a pigment and a solvent, and may contain a dispersant, a resin and other components as required.

The solvent used in the present invention comprises 30 to 70% by weight of a non-polar solvent, and in other words, 70 to 30% by weight of a polar solvent. And, 20% by weight or more of the entire solvent is constituted by an ester solvent having an $\alpha$ value of 6° to 8°. Here, the ester solvent belongs to the polar solvent. Accordingly, the ester solvent having an $\alpha$ value of 6° to 8° may constitute 20 to 70% by weight of the entire solvent. When the ester solvent having an $\alpha$ value of 6° to 8° constitutes 70% by weight of the entire solvent, the polar solvent is composed only of the ester solvent having an $\alpha$ value of 6° to 8°. When the ester solvent having an $\alpha$ value of 6° to 8° constitutes 30% by weight to less than 70% by weight of the entire solvent, the polar solvent may be composed only of the ester solvent having an $\alpha$ value of 6° to 8°, or another polar solvent may be used in combination. When the ester solvent having an $\alpha$ value of 6° to 8° constitutes 20% by weight to less than 30% by weight of the entire solvent, another polar solvent is used in combination with the ester solvent having an $\alpha$ value of 6° to 8° so that the total of the polar solvents constitutes 30 to 70% by weight of the entire solvent. When the ester solvent having an value of 6° to 8° and another polar solvent are used in combination, the latter solvent is preferably a polar solvent other than the ester solvents so as to reduce toner solubility.

Examples of ester solvents having an $\alpha$ value of 6° to 8° include higher fatty acid esters such as isooctyl palmitate ($\alpha$ value 7.28°), hexyl palmitate ($\alpha$ value 7.77°), isooctyl isopalmitate ($\alpha$ value 7.43°), butyl stearate ($\alpha$ value 7.77°), hexyl stearate ($\alpha$ value 7.13°), isooctyl stearate ($\alpha$ value 6.71°), hexyl oleate ($\alpha$ value 7.36°) and 2-octyldodecyl pivalate ($\alpha$ value 7.28°). In this specification, "higher" means having 9 or more, preferably 12 or more carbon atoms in a molecule. Preferred higher fatty acid esters constituting the ester solvent having an $\alpha$ value of 6° to 8° include compounds containing 22 to 32 carbon atoms in a molecule.

The $\alpha$ value means the value of a determined by tan $\alpha$=(inorganic value/organic value). Herein the "organic value" and the "inorganic value" are based on the notion used in the "organic conception diagram" proposed by Atsushi Fujita, in which nature of organic compounds is categorized by two factors of "organic nature" derived from the chain of covalent bonds of carbon chains and "inorganic nature" derived from the influence of electrostatic properties in substituents (functional groups), and each factor is determined from the structure of compounds and converted to numerical values. The a value indicates the quantitative balance between the "organic nature" and the "inorganic nature" of a compound. Details of the "organic conception diagram" are described in "Systematic Qualitative Organic Analysis (Mixtures)", Atsushi Fujita et al., Kazama Shobo Co., Ltd. (1974).

Since the ester solvent having an $\alpha$ value of 6° to 8° has appropriate polarity, use of the ester solvent in inkjet ink prevents increase in viscosity of the solvent with time and solidification in low temperature environment, thereby maintaining on-machine stability, and at the same time, prevents dissolution of toner resins.

The other polar solvents which can be used in combination with the ester solvent having an α value of 6° to 8° are not particularly limited. Examples thereof include organic polar solvents such as ester solvents other than the ester solvents having an α value of 6° to 8°, alcohol solvents, higher fatty acid solvents and ether solvents.

Examples of ester solvents other than the ester solvents having an α value of 6° to 8° include methyl laurate (α value 12.99°), isopropyl laurate (α value 11.69°), isopropyl myristate (α value 10.30°), isopropyl palmitate (α value 9.21°), isostearyl palmitate (α value 5.12°), methyl oleate (α value 9.27°), ethyl oleate (α value 8.81°), isopropyl oleate (α value 8.60°), butyl oleate (α value 8.02°), methyl linoleate (α value 9.41°), isobutyl linoleate (α value 8.15°), ethyl linoleate (α value 8.95°) and isopropyl isostearate (α value 8.53°). In addition, ester solvents such as soybean oil methyl ester, soybean oil isobutyl ester, tall oil methyl ester, tall oil isobutyl ester, diisopropyl adipate, diisopropyl sebacate, diethyl sebacate, propylene glycol monocaprate, trimethylolpropane tri-2-ethyl hexanoate and glycerol tri-2-ethyl hexanoate may be used.

Examples of alcohol solvents include higher alcohols such as isomyristyl alcohol, isopalmityl alcohol, isostearyl alcohol and oleyl alcohol.

Examples of higher fatty acid solvents include isononanoic acid, isomyristic acid, hexadecanoic acid, isopalmitic acid, oleic acid and isostearic acid.

Examples of ether solvents include glycol ethers such as diethylene glycol monobutyl ether, ethylene glycol monobutyl ether, propylene glycol monobutyl ether and propylene glycol dibutyl ether.

Of these, alcohol solvents, higher fatty acid solvents and ether solvents are preferably used in combination with the ester solvent having an α value of 6° to 8°, and alcohol solvents are particularly preferred.

The non-polar solvent includes petroleum hydrocarbon solvents such as naphthene, paraffin or isoparaffin solvents. Specific examples thereof include "Isopar" and "Exxol" (both trade names) available from Exxon Mobil Corporation, "AF Solvent" (trade name) available from Nippon Oil Corporation and "Sunthene" and "Sunpar" (both trade names) available from Sunoco Inc.

The pigment used in the present invention is not particularly limited and those generally used in the field of printing can be used regardless of whether it is an organic pigment or an inorganic pigment. Specifically, carbon black, cadmium red, chromium yellow, cadmium yellow, chromium oxide, viridian, titanium cobalt green, ultramarine blue, Prussian blue, cobalt blue, azo pigments, phthalocyanine pigments, quinacridone pigments, isoindolinone pigments, dioxazine pigments, threne pigments, perylene pigments, thioindigo pigments, quinophthalone pigments and metal complex pigments can be preferably used. These pigments may be used alone or in combination.

Preferably, the pigment is contained in the ink in a proportion of 0.01 to 20% by weight based on the total amount of the ink.

The dispersant used in the present invention is not particularly limited as long as it disperses the pigment in the solvent in a stable state. For example, hydroxyl group-containing carboxylic acid esters, salts of long-chain polyaminoamide and high molecular weight acid ester, salts of high molecular weight polycarboxylic acid, salts of long-chain polyaminoamide and polar acid ester, high molecular weight unsaturated acid esters, high molecular weight copolymers, modified polyurethanes, modified polyacrylates, polyether ester anionic surfactants, naphthalenesulfonic acid formalin condensate salts, polyoxyethylene alkyl phosphoric acid esters, polyoxyethylene nonyl phenyl ethers, polyester polyamines and stearylamine acetate are preferably used. Of these, high molecular weight dispersants are preferably used.

Specific examples of dispersants include "Solsperse 5000 (phthalocyanine ammonium salt type), 13940 (polyester amine type), 17000, 18000 (aliphatic amine type), 11200, 22000, 24000, 28000)" (all trade names) available from Lubrizol Japan Ltd., "Efka 400, 401, 402, 403, 450, 451, 453 (modified polyacrylate), 46, 47, 48, 49, 4010, 4055 (modified polyurethane)" (all trade names) available from Efka CHEMICALS, "Demor P, EP, Poiz 520, 521, 530, Homogenol L-18 (high molecular weight polycarboxylic acid surfactant)" (all trade name) available from KAO CORPORATION, "Disparlon KS-860, KS-873N4 (amine salt of high molecular weight polyester)" (both trade name) available from Kusumoto Chemicals Ltd., and "Discol 202, 206, OA-202, OA-600 (multi-chain high molecular weight nonionic surfactant)" (all trade name) available from DAI-ICHI KOGYO SEIYAKU CO., LTD.

The content of the dispersant is such that the pigment is sufficiently dispersed in the ink, and is accordingly determined.

In addition to the solvent, the dispersant and the pigment, a dye, a surfactant or a preservative, for example, may be added to the inkjet ink of the present invention as long as the on-machine stability or oxidation stability of the ink is not affected.

The inkjet ink of the present invention can be prepared by introducing the components into a known dispersing machine such as a bead mill at once or in installments and dispersing, and passing the components through a known filtering device such as a membrane filter if desired. Specifically, the ink can be prepared by preparing in advance a mixture in which part of the solvent and all of the pigment and the dispersant are homogeneously mixed and dispersing the mixture in a dispersing machine, and then adding the rest of the components to the resulting dispersion and passing the mixture through a filtering device.

The viscosity at 23° C. of the inkjet ink of the present invention thus produced is adjusted to preferably 5 to 30 mPa·s, more preferably 7 to 14 mPa·s, which are suitable for ejecting the ink from an inkjet head nozzle. Preferably, the solidifying point of the ink is adjusted to −5° C. or lower so that the ink does not freeze under storage conditions.

EXAMPLES

In the following, the present invention is described in more detail by means of Examples, but the present invention is not limited to these Examples. Examples 1 to 6, Comparative Examples 1 to 7

An inkjet ink was prepared by premixing the components shown in Table 1 at a ratio shown in Table 1 and dispersing the mixture in a bead mill for about 10 minutes. The mixing amount of each component is expressed as % by weight in Table 1.

The on-machine stability and the toner solubility of each inkjet ink prepared in Examples and Comparative Examples were evaluated according to the following methods. The evaluation results are shown in Table 2.

(1) On-Machine Stability of Ink

After preparing each ink, the ink was installed in an inkjet printer "ORPHIS HC5000" (trade name, made by Riso Kagaku Corporation) and allowed to stand at 35° C. for 3 months. (During the period, the inkjet head nozzle was not sealed and the solvent in the ink continued to evaporate.) After allowing it to stand, "strong cleaning", which is one of the head cleaning functions of ORPHIS HC5000, was performed once, and then solid printing was performed. When non-ejection of the ink from the head nozzle occurred (i.e., when a white streak was found in the printed image) at this moment, additional "strong cleaning" was performed once and then solid printing was performed. The on-machine stability was evaluated according to the following criteria.

◯: no non-ejection (no white streak in printed image) after first strong cleaning
Δ: no non-ejection after second strong cleaning
×: non-ejection found even after second strong cleaning (2) Toner Solubility Each ink prepared in Examples and Comparative Examples was installed in an inkjet printer "ORPHIS HC5000" (trade name, made by Riso Kagaku Corporation), and solid printing was performed on HC paper IJ (trade name, available from Riso Kagaku Corporation) to obtain ink-jet printed matters. Solid printing was also performed on Riso thin paper (trade name, available from Riso Kagaku Corporation) using a laser printer "PRIOA LS-9500DN" (trade name, made by Riso Kagaku Corporation) to obtain toner-printed matters. The print surface of the ink-jet printed matter was laid on the print surface of the toner-printed matter, and was left at 30° C. for a month. The printed matters were peeled apart and stain on the print surfaces was visually observed and evaluated according to the following criteria.

×: Toner is transferred to inkjet print surface and stain on the print surface is remarkable.
◯: Stain on the print surface is not remarkable.

(3) Ink Viscosity

The viscosity was measured immediately after preparing the ink using Rheometer RS75 made by Haake GmbH.

TABLE 1

| | | | Example 1 | Example 2 | Example 3 | Example 4 | Example 5 | Example 6 | Comparative Example 1 |
|---|---|---|---|---|---|---|---|---|---|
| pigment | carbon black | MA8 | 5.0 | 5.0 | 5.0 | 5.0 | 5.0 | 5.0 | 5.0 |
| Dispersant | | S5000 | — | — | — | 2.0 | 2.0 | 2.0 | 2.0 |
| | | S28000 | — | — | — | 3.0 | 3.0 | 3.0 | 3.0 |
| | | S11200 (containing 50% by weight of aliphatic hydrocarbon (non-polar solvent)) | 5.0 | 5.0 | 5.0 | — | — | — | — |
| polar solvent | ester solvent α = 7.28° | isooctyl palmitate | 45.0 | 60.0 | 30.0 | — | — | — | 10.0 |
| | ester solvent α = 7.43° | isooctyl isopalmitate | — | — | — | — | — | 20.0 | — |
| | ester solvent α = 9.21° | isopropyl palmitate | — | — | — | — | — | — | — |
| | ester solvent α = 7.28° | 2-octyldodecyl pivalate | — | — | — | — | 20.0 | — | — |
| | ester solvent α = 5.12° | isostearyl palmitate | — | — | — | — | — | — | — |
| | ester solvent α = 6.71° | isooctyl stearate | — | — | — | 20.0 | — | — | — |
| | ester solvent α = 9.27° | methyl oleate | — | — | — | — | — | — | — |
| | ester solvent α = 8.02° | butyl oleate | — | — | — | — | — | — | — |
| | alcohol solvent | isostearyl alcohol | — | — | — | 25.0 | 25.0 | 25.0 | — |
| non-polar solvent | petroleum hydrocarbon | AF4 | 45.0 | 30.0 | 60.0 | 45.0 | 45.0 | 45.0 | 80.0 |
| | petroleum hydrocarbon | AF6 | — | — | — | — | — | — | — |
| | total (% by weight) | | 100 | 100 | 100 | 100 | 100 | 100 | 100 |

| | | | Comparative Example 2 | Comparative Example 3 | Comparative Example 4 | Comparative Example 5 | Comparative Example 6 | Comparative Example 7 |
|---|---|---|---|---|---|---|---|---|
| pigment | carbon black | MA8 | 5.0 | 5.0 | 5.0 | 5.0 | 5.0 | 5.0 |
| Dispersant | | S5000 | — | — | — | — | — | 2.0 |
| | | S28000 | — | — | — | — | — | 3.0 |
| | | S11200 (containing 50% by weight of aliphatic hydrocarbon (non-polar solvent)) | 5.0 | 5.0 | 5.0 | 5.0 | 5.0 | — |

TABLE 1-continued

| | | | | | | | | |
|---|---|---|---|---|---|---|---|---|
| polar solvent | ester solvent α = 7.28° | isooctyl palmitate | 60.0 | 10.0 | 80.0 | — | — | — |
| | ester solvent α = 7.43° | isooctyl isopalmitate | — | — | — | — | — | — |
| | ester solvent α = 9.21° | isopropyl palmitate | — | — | — | — | 30.0 | — |
| | ester solvent α = 7.28° | 2-octyldodecyl pivalate | — | — | — | — | — | — |
| | ester solvent α = 5.12° | isostearyl palmitate | — | — | — | — | — | 30.0 |
| | ester solvent α = 6.71° | isooctyl stearate | — | — | — | — | — | — |
| | ester solvent α = 9.27° | methyl oleate | 20.0 | 20.0 | — | — | — | — |
| | ester solvent α = 8.02° | butyl oleate | — | — | — | 30.0 | — | — |
| | alcohol solvent | isostearyl alcohol | — | — | — | — | — | — |
| non-polar solvent | petroleum hydrocarbon | AF4 | 10.0 | 60.0 | 10.0 | — | — | — |
| | petroleum hydrocarbon | AF6 | — | — | — | 60.0 | 60.0 | 60.0 |
| | total (% by weight) | | 100 | 100 | 100 | 100 | 100 | 100 |

TABLE 2

| | Example 1 | Example 2 | Example 3 | Example 4 | Example 5 | Example 6 | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|---|---|---|---|
| ink viscosity (mPa · S) | 9.1 | 11.3 | 7.2 | 11.6 | 12.2 | 11.0 | 6.0 | 14.3 | 6.5 | 14.9 | 9.9 | 9.0 | 16.1 |
| ratio of solvent in ink (% by weight) | 92.5 | 92.5 | 92.5 | 90.0 | 90.0 | 90.0 | 90.0 | 92.5 | 92.5 | 92.5 | 92.5 | 92.5 | 90.0 |
| ratio of non-polar solvent in solvent (% by weight) | 51.4 | 35.1 | 67.6 | 50.0 | 50.0 | 50.0 | 88.9 | 13.5 | 67.6 | 13.5 | 67.6 | 67.6 | 66.7 |
| ratio of ester solvent having an α value of 6° to 8° in solvent (% by weight) | 48.6 | 64.9 | 32.4 | 22.2 | 22.2 | 22.2 | 11.1 | 64.9 | 10.8 | 86.5 | 0.0 | 0.0 | 0.0 |
| ratio of ester solvent other than ester solvent having an α value of 6° to 8° in solvent (% by weight) | 0.0 | 0.0 | 0.0 | 0.0 | 0.0 | 0.0 | 0.0 | 21.6 | 21.6 | 0.0 | 32.4 | 32.4 | 33.3 |
| on-machine stability | ○ | ○ | ○ | Δ | ○ | ○ | X | ○ | ○ | ○ | ○ | ○ | X |
| toner solubility | ○ | ○ | ○ | ○ | ○ | ○ | ○ | X | X | X | X | X | ○ |

The symbols of raw materials described in Table 1 are as follows.

MA8 (trade name): Carbon black available from Mitsubishi Chemical Corporation.
S5000: Dispersant Solsperse 5000 (trade name) available from Lubrizol Japan Ltd.
S28000: Dispersant Solsperse 28000 (trade name) available from Lubrizol Japan Ltd.
S11200: Dispersant Solsperse 11200 (trade name) available from Lubrizol Japan Ltd., containing 50% of an aliphatic hydrocarbon (non-polar) solvent.
AF4 (trade name): Petroleum hydrocarbon solvent available from Nippon Oil Corporation.
AF6 (trade name): Petroleum hydrocarbon solvent available from Nippon Oil Corporation.

The results in Table 1 show that in Examples 1 to 6, which are included in the scope of the present invention, since 30 to 70% by weight of the solvent is composed of a non-polar solvent and 20% by weight or more of the solvent is composed of an ester solvent having an α value of 6° to 8°, the ink is excellent in on-machine stability and has sufficiently reduced toner solubility. In Examples 1 to 3, 5 and 6, since an ester solvent having an α value of 7° to 8° is used, still better results are obtained.

On the contrary, since the mixing amount of the non-polar solvent is too high and the mixing amount of the ester solvent having an α value of 6° to 8° is too small in Comparative Example 1, the ink has poor on-machine stability. Since the mixing amount of the non-polar solvent is too small in Comparative Example 2, reduction of toner solubility is insufficient. Since the mixing amount of the ester solvent having an α value of 6° to 8° is too small in Comparative Example 3, reduction of toner solubility is insufficient. Since the mixing amount of the ester solvent having an α value of 6° to 8° is too high in Comparative Example 4, reduction of toner solubility is insufficient. Since an ester solvent having an α value of more than 8° is used and the ester solvent having an α value of 6° to 8° is not used in Comparative Examples 5 and 6, reduction of toner solubility is insufficient. Since an ester solvent having an α value of less than 6° is used and the ester solvent having an α value of 6° to 8° is not used in Comparative Example 7, the ink has poor on-machine stability.

Since the inkjet ink of the present invention is excellent in on-machine stability and has reduced toner solubility, the ink is suitably used for producing printed matters such as pamphlets by stacking the inkjet print surface with printed surfaces printed using a plane paper copier or a laser printer, and useful in the field of inkjet printing.

The invention claimed is:

1. An inkjet ink comprising at least a pigment and a solvent, wherein 30 to 70% by weight of the solvent is constituted by a non-polar solvent, and 20 to 48.6% by weight of the solvent is constituted by an ester solvent having an α value of 6° to 8°, and said inkjet ink has a viscosity at 23° C. of 7 to 14 mPa·s.

2. An inkjet ink according to claim 1, wherein the ester solvent is one having an α value of 7° to 8°.

3. An inkjet ink according to claim 1, wherein the ester solvent is at least one member selected from the group consisting of isooctyl palmitate, isooctyl isopalmitate and 2-octyldodecyl pivalate.

4. An inkjet ink according to claim 1, which comprises a polar solvent other than the ester solvent.

5. An inkjet ink according to claim 4, in which the polar solvent other than the ester solvent is an alcohol solvent.

6. An inkjet ink according to claim 5, in which the alcohol solvent is selected from the group consisting of isomyristyl alcohol, isopalmityl alcohol, isostearyl alcohol and oleyl alcohol.

* * * * *